United States Patent Office 3,346,581
Patented Oct. 10, 1967

3,346,581
HALOPHENYL HEXAHYDRO BENZOQUINOLIZINES
Johan Gootjes, Heerhugowaard, North Holland, Netherlands, assignor to N.V. Koninklijke Pharmaceutische Fabrieken v/h Brocades-Stheeman en Pharmacia, Amsterdam, Netherlands, a Dutch corporation
No Drawing. Filed May 20, 1964, Ser. No. 369,012
Claims priority, application Netherlands, Mar. 27, 1961, 262,858; Jan. 15, 1962, 273,566
6 Claims. (Cl. 260—286)

This application is a continuation-in-part of abandoned application Serial No. 182,652, filed Mar. 26, 1962.

This invention relates to the provision of new benzoquinolizines, processes for the preparation of the same, and new intermediates useful in said processes.

The final products of this invention include bases of the general formula (I):

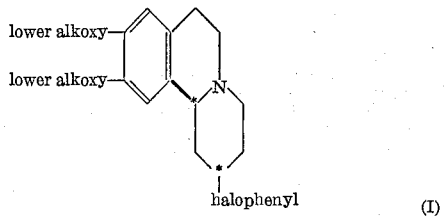

(I)

and acid-addition salts thereof.

Inasmuch as the compounds have two asymmetrically substituted carbon atoms (indicated by asterisks in Formula I), cis and trans isomers may be postulated. The first method of synthesizing the compounds of Formula I, described below, yields both isomers which may be separated by crystallization. The second method yields one isomer only depending on the reducing agent used in the final reaction step either the trans or the cis isomer is isolated. Other methods for the production of similar compounds found in the literature yield in the present instance primarily or exclusively the cis isomer. This is a matter of importance since the trans isomers have analgesic activity whereas the cis isomers do not. It is therefore a primary object of this invention to produce the trans-isomers. The second method described below is therefore preferred over the first one. Illustrative of the group defined by "halophenyl" are chlorophenyl, bromophenyl and fluorophenyl and especially the para isomers.

Among the suitable acid-addition salts of this invention may be mentioned the non-toxic acid-addition salts, as exemplified by the salts with inorganic acids, such as the hydrohalic acids (e.g. hydrochloric and hydrobromic acid), sulfuric acid, and phosphoric acid, and organic acids, such as acetic acid, oxalic acid, fumaric acid and tartaric acid.

The compounds of this invention are pharmacologically active substances which possess analgesic activity and either the base or a physiologically acceptable acid addition salt can be formulated for this use in the usual pharmaceutical forms, such as tablets and capsules according to conventional formulation practices.

The compounds of this invention can be prepared by the following methods. In accordance with one method of this invention an ethylamine of the Formula II:

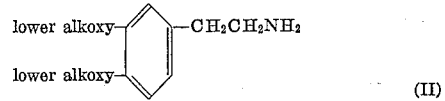

(II)

is reacted with a glutaric acid anhydride of the Formula III:

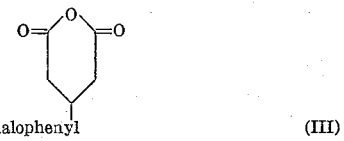

(III)

to yield the intermediate of the general Formula IV:

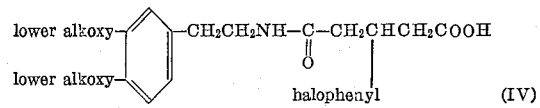

(IV)

Suitable ethylamines which can be employed as initial reactants in this process include di(lower alkoxy)phenethylamines such as m,p-dimethoxyphenethylamine, m, p-diethoxyphenethylamine and the like.

Suitable glutaric acid anhydrides which can be employed as initial reagents in this process include 3-halophenyl substituted glutaric acid anhydrides such as 3-(p-chlorophenyl) glutaric anhydride, 3-(m-chlorophenyl) glutaric anhydride, 3-(o-chlorophenyl) glutaric anhydride, 3-(p-bromophenyl) glutaric anhydride, 3-(p-fluorophenyl) glutaric anhydride and the like.

The resulting amide (Compound IV) is then cyclized to the corresponding dihydropyridine derivatives, preferably after esterification of the free acid group, as by treatment with diazo (lower alkane) (e.g., diazomethane), to yield the intermediate of the general Formula V:

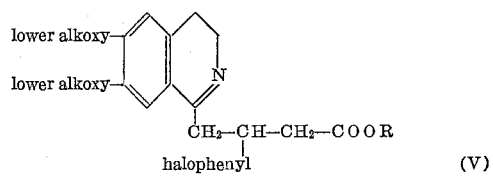

(V)

wherein R is hydrogen or lower alkyl. The reaction is preferably effected by the use of phosphorus oxychloride at an elevated temperature, optimally at the reflux temperature of the organic solvent used in the reaction.

The dihydropyridine (Compound V) is then hydrogenated to the tetrahydropyridine derivative of the general Formula VI:

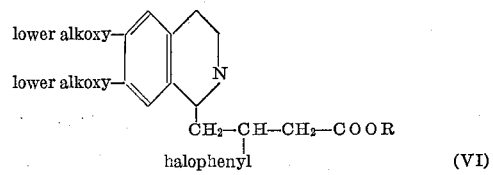

(VI)

wherein R is as hereinbefore defined.

The hydrogenation is preferably conducted by use of hydrogen in the presence of a hydrogenation catalyst such as a noble metal (e.g., platinum), or sodium borohydride. The reaction results in a mixture of the two isomers, which need not be separated for use in the next step of the process of this invention.

The tetrahydropyridine (Compound VI) is then cyclized by heating, preferably to the reflux temperature of an organic solvent, such as xylene, to yield an intermediate of the general Formula VII:

<center> lower alkoxy—⟨benzo-quinolizinone with halophenyl substituent⟩=O halophenyl (VII)
</center>

Compound VII is then reduced, as by treatment with lithium aluminum hydride, to yield the final compound of Formula I. The mixture of cis and trans isomers is then separated by fractional crystallization, preferably of an acid-addition salt such as the hydrochloride, e.g., from acetone or diethyl ether, or the like, to obtain the respective isomeric compounds.

According to a modification of the above described method a compound of Formula III is converted with a lower alkanol, preferably methanol, into a compound of the Formula VIII:

$$HOOC-CH_2CHCH_2COO \text{ (lower alkyl)}$$
$$|$$
$$\text{halophenyl} \quad \text{(VIII)}$$

which is then reacted with thionyl chloride to form the acid chloride, and the latter is reacted with an amine of Formula II to yield the lower alkyl ester of the compound of Formula IV. A compound of the Formula V is then obtained by treatment of the ester with phosphorus oxychloride to effect cyclization.

Alternatively, the compounds of this invention can be prepared by a second process of this invention by reacting a lower alkyl 5-bromo-valerate of the Formula IX:

$$BrCH_2CH_2CHCH_2COO \text{ (lower alkyl)}$$
$$|$$
$$\text{halophenyl} \quad \text{(IX)}$$

with a compound of Formula II, as hereinbefore defined, to yield the intermediate of the Formula X:

<center>
lower alkoxy—⟨ring structure⟩—CH₂—CH₂
N=O
halophenyl (X)
</center>

The reaction is preferably conducted in the presence of a basic agent, such as potassium carbonate, at an elevated temperature, such as the reflux temperature of the organic solvent employed in the reaction.

The compounds of Formula IX can be obtained from valerolactones of the general Formula XI:

<center>
O=⟨lactone ring⟩
halophenyl (XI)
</center> by treatment with an alcoholic solution of hydrogen bromide.

Suitable lower alkyl 5-bromovalerates include the methyl and ethyl esters of such 3-(halophenyl)-5-bromovaleric acids as 5-bromo-3-(o-chlorophenyl)valeric acid, 5-bromo-3-(2-chlorophenyl)valeric acid, 5 - bromo - 3 - (p-chlorophenyl)valeric acid, 5-bromo - 3 - (p - fluorophenyl)valeric acid and 5-bromo-3 - (p - bromophenyl) valeric acid.

The compounds of Formula X are then cyclized, for example, by treatment with phosphorus oxychloride at an elevated temperature, optimally the reflux temperature used in the reaction to yield an intermediate of the general Formula XII:

<center>
[lower alkoxy—⟨benzoquinolizinium⟩—N⁺ ]X⁻
halophenyl (XII)
</center> wherein X is a halogen atom.

Compound XII is then reduced, for example, by treatment with sodium borohydride, platinum and hydrogen (which yields exclusively the cis isomer) or with hydrogen and metal, e.g., zinc (which yields exclusively the trans isomer) to yield the final product of this invention (Compound I).

According to a modification of the second process a valerolactone XI, in lieu of a bromovalerate IX, is reacted with a compound of Formula II to yield an intermediate of the general Formula XIII:

<center>
lower alkoxy—⟨phenyl⟩—CH₂—CH₂—NH—C—CH₂—CH—CH₂CH₂OH
                                        ‖
lower alkoxy—                            O
                                              |
                                        halophenyl (XIII)
</center>

The amide of the Formula XIII is then cyclized by treatment, preferably at the reflux temperature of the solvent used in the reaction, with phosphorus oxychloride to yield an intermediate of the Formula XIV:

<center>
lower alkoxy—⟨dihydroisoquinoline⟩
lower alkoxy—               N
                            |
                    CH₂—CH—CH₂Cl
                        |
                    halophenyl (XIV)
</center>

Preferably the compound of Formula XIV is not isolated and purified but converted into a compound of the Formula XII by subsequent treatment with ammonia and a hydrochloride acid solution.

The following examples illustrate the invention (all temperatures being in centigrade):

EXAMPLE 1

2-(p-chlorophenyl)-1,3,4,6,7,11b-hexahydro-9,10-dimethoxy-2H-benzo [a]quinolizine A. PREPARATION OF 3-(p-CHLOROPHENYL)GLUTARIC ANHYDRIDE 140 g. (one mol.) of p-chlorobenzaldehyde, 260 g. (two mol.) of ethyl acetoacetate, 50 ml. of ethanol and 20 ml. of piperidine are mixed. After 15 hours standing at room temperature, diethyl 2-(p-chlorophenyl)-4-hydroxy-4-methyl-6-oxo-1,3 - cyclohexanedicarboxylate is obtained as a crystalline product. Melting point 144–148° after crystallization from ethanol. Yield 74%.

To 83 g. of the ester is added a warm solution of 495 g. of potassium-hydroxide in 385 ml. of distilled water. The temperature is maintained at 90–95° for two hours. After cooling and dilution with about 1800 ml. of distilled water, the solution is extracted with ether. The water layer is acidified and crystalline 3-(p-chlorophenyl)glutaric acid is obtained by filtration. Melting point 160–162°. Yield 76%. The anhydride is obtained from the acid by boiling under reflux with a two fold amount of acetic anhydride. The product melts at 131–133°. Yield 90%.

In a similar manner, the following β-substituted glutaric anhydrides are obtained:

| Substituent in β-position: | Melting point, ° |
|---|---|
| o-Chlorophenyl | 107–109 |
| m-Chlorophenyl | 142–144 |

| Substituent in β-position: | Melting point, ° |
|---|---|
| p-Fluorophenyl | 102–103 |
| p-Bromophenyl | 160–161 |

B. PREPARATION OF 3-(p-CHLOROPHENYL)-N-(3,4-DIMETHOXYPHENETHYL)GLUTARAMIC ACID 7.3 g. of 3,4-dimethoxyphenethylamine in 10 ml. of benzene is slowly added to 9.3 g. of 3-(p-chloro)glutaric anhydride in 30 ml. of benzene. An exothermic reaction takes place whereupon the amide soon starts to crystallize. After cooling the reaction mixture, the product can be isolated. The compound melts, after several crystallizations from a mixture of petroleum ether (boiling range 60–80°) and ethyl acetate, at 124–125°. Yield 96%.

In a similar manner 3-(p-bromophenyl) - N - 3,4 - dimethoxyphenyl) glutaramic acid, melting at 124–126°, after crystallization from a mixture of acetone and ether, is obtained in 85% yield from 3,4-dimethoxyphenethylamine and 3-(p-bromo)glutaric anhydride.

C. PREPARATION OF METHYL-3-(p-CHLOROPHENYL)-4-(3,4-DIHYDRO - 6,7 - DIMETHOXYISOQUINOL-1-YL) BUTYRATE

A solution of diazomethane in ether is slowly added to 13.4 g. of 3-(p-chlorophenyl) - N - (3,4 - dimethoxyphenethyl)glutaramic acid in 50 ml. of ether and 5 ml. of methanol. Nitrogen is evolved and the yellow diazomethane color disappears as the ester formed dissolves in the reaction mixture. Ether is removed under reduced pressure and the oily residue is heated under reflux with 50 ml. of freshly distilled phosphorous oxychloride and 50 ml. of anhydrous benzene for 2 hours, HCl gas being evolved during the process. After removal of benzene and excess phosphorous oxychloride by distillation under reduced pressure, the residual phosphorous oxychloride is decomposed with methanol under cooling. The methanol is distilled off leaving an oil which crysallizes upon cooling. The reaction mixture is made alkaline and extracted several times with ether, 5 g. of oxalic acid in ether is added to the dried ethereal solution. Yield 92% of oxalate, melting at 135–137°.

(D) PREPARATION OF 2-(p-CHLOROPHENYL)-1,2,3,6,7,11b - HEXAHYDRO - 9,10 - DIMETHOXY-4H-BENZO[a]QUINOLIZIN-4-ONE

A dilute solution of sodium hydroxide is added to 78 g. methyl 3-(p-chlorophenyl)-4-(3,4-dihydro-6,7-dimethoxyisoquinol-1-yl)-butyrate. The free aminoester is set free and extracted with ether. The ether solution is washed, dried with sodium sulphate, filtered and the ether removed by distillation. The residue is dissolved in 200 ml. of methanol and 250 mg. of Adams' catalyst is added.

The mixture is shaken with hydrogen at normal pressure for three hours during which 3560 ml. of hydrogen is absorbed. After removal of the catalyst by filtration 26 g. (43%) of cis-2-(p-chlorphenyl)-1,2,3,6,7,11b-hexahydro-9,10-dimethoxy-4H-benzo[a]quinolizin-4 - one, melting at 149–150° after crystallization from methanol, is obtained. From the filtrate methanol is distilled off and xylene is added to the residue.

The solution is refluxed for two hours and xylene is distilled off leaving 35 g. of crude trans-2-(p-chlorophenyl)-1,2,3,6,7,11b-hexahydro - 9,10 - dimethoxy - 4H-benzo[a]quinolizin-4-one which is used in the next reaction step without purification.

E. PREPARATION OF TRANS - 2 - (p - CHLOROPHENYL)-1,3,4,6,7,11b - HEXAHYDRO - 9,10 - DIMETHOXY - 2H-BENZO[a]QUINOLIZINE 2.1 g. of trans 2-(p-chlorophenyl)-1,3,4,6,7,11b-hexahydro-9,10-dimethoxy-2H-benzo[a]quinolizin - 4 - one is dissolved in 50 ml. of anhydrous tetrahydrofuran and added gradually to a refluxing suspension of 0.4 g. of lithium aluminum hydride in 50 ml. of tetrahydrofuran. The mixture is heated under reflex for two hours after which the excess lithium aluminum hydride is decomposed with a little water. The metal hydroxides obtained are removed by filtration and washed with tetrahydrofuran. After drying with sodium sulphate and filtration, the tetrahydrofuran is distilled off, leaving 1.7 g. of trans-2-(p - chlorophenyl) - 1,3,4,6,7,11b - hexahydro - 9,10 - dimethoxy-2H-benzo[a]quinolizine. The hydrochloride of the base, prepared in ether, melts at 264–266° after crystallization from dimethylformamide.

EXAMPLE 2

2-(p-chlorophenyl)-1,2,3,6,7,11b-hexahydro-9,10-dimethoxy-2H-benzo[a]quinolizine A. PREPARATION OF METHYL-HYDROGEN-3-(p-CHLOROPHENYL)GLUTARATE A mixture of 117 g. of 3-(p-chlorophenyl)glutaric anhydride (prepared as described in Example 1, step A) and 59 g. of methanol is heated on a water bath for 3 hours. The ester crystallizes on cooling of the reaction mixture and is filtered off. Yield 110 g. of methyl hydrogen-3-(p-chlorophenyl)glutarate; melting point 100–101° after crystallization from benzene.

In a similar manner, the following 3-substituted methylhydrogen glutarates are obtained:

| Substituent in 3-position | Boiling point | Melting point, degrees |
|---|---|---|
| o-Chlorophenyl | 185–187°/2 mm | |
| m-Chlorophenyl | | 73–76 |
| p-Fluorophenyl | | 97–98 |
| p-Bromophenyl | | 98–99 |

B. PREPARATION OF METHYL-3-(p-CHLOROPHENYL-4-(3,4 - DIHYDRO - 6,7 - DIMETHOXYISOQUINOL-1-YL) BUTYRATE 995 g. of methylhydrogen 3-(p-chlorophenyl)glutarate is treated overnight with 620 ml. of freshly distilled thionyl chloride. After removal by distillation of excess thionyl chloride 2000 ml. of benzene is added to the residue and the solution is added dropwise to 720 g. of 3,4-dimethoxyphenethylamine in 3000 ml. of benzene and 1000 ml. of pyridine. The mixture is heated at 80° for one hour. After cooling, pyridine hydrochloride is removed by filtration. The benzene solution is washed with water and dried with sodium sulphate. After filtration, the solvent is removed by distillation leaving 1520 g. of crystalline methyl 3-(p-chlorophenyl)-N-(3,4-dimethoxyphenethyl)glutaramate, melting at 86–89°.

1520 g. of methyl 3-(p-chlorophenyl)-N-(3,4-dimethoxyphenethyl)glutaramate in 1500 ml. of chloroform is refluxed for two hours with 1850 ml. of phosphorus oxychloride and 1850 ml. of chloroform. The chloroform and excess phosphorus oxychloride are distilled off and the residue is treated with a solution of potassium bicarbonate in water. The mixture is extracted with ether and the ethereal solution dried with potassium carbonate. After filtration, ether is distilled off leaving 1170 g. of crude methyl 3-(p-chlorophenyl)-4-(3,4-dihydro-6,7-dimethoxyisoquinol-1-yl)butyrate. Purification is effected via the oxalate which melts at 135–136° after crystallization from a mixture of ethyl acetate and acetone.

In a similar manner the following 3-substituted methyl 4 - (3,4 - dihydro-6,7-dimethoxyisoquinol-1-yl)butyrates are obtained.

| Substituent in 3-position: | Melting point of oxalate, ° |
|---|---|
| o-Chlorophenyl | 136–137 |
| m-Chlorophenyl | 103.5–106 |
| p-Fluorophenyl | 141.5–142.5 |
| p-Bromophenyl | 126.5–128 |

C. PREPARATION OF 2-(p-CHLOROPHENYL)-1,2,3,6,7,11b - HEXAHYDRO - 9,10 - DIMETHOXY-4H-BENZO[a]QUINOLIZIN-4-ONE 253 g. of methyl-3-(p-chlorophenyl)-4-(3,4-dihydro-6,7-dimethoxyisoquinol-1-yl)butyrate is dissolved in 650 ml. of methanol. 1 g. of Adams' catalyst is added. The mixture is shaken with hydrogen under a pressure of 10 atm. for three hours during which the theoretical amount of hydrogen is absorbed. After removal of the catalyst and of 680 g. of cis 2-(p-chlorophenyl)-1,2,3,6,7,11b-hexahydro - 9,10 - dimethoxy-4H-benzo[a]quinolizin-4-one, methanol is distilled off.

Xylene is added to the residue and the solution refluxed for two hours. Xylene is distilled off leaving a residue of 820 g. of trans 2-(p-chlorophenyl)-1,2,3,6,7,-11b - hexahydro-9,10-dimethoxy-4H-benzo[a]quinolizin-4-one which is used in the next reaction step without purification.

The cis 2 - (p - chlorophenyl)-1,2,3,6,7,11b-hexahydro-9,10 - dimethoxy-4H-benzo[a]quinolizin-4-one melts at 149–150° after crystallization from methanol.

In a similar manner the folowing cis 2-substituted 1,2,3,6,7,11b - hexahydro - 9,10-dimethoxy-4H-benzo[a]quinolizin-4-ones are obtained.

Substituent in 2-position: Melting point, °
o-Chlorophenyl _____ Not purified.
m-Chlorophenyl _____ Not purified.
p-Fluorophenyl _____ 173–174.
p-Bromophenyl _____ 167.5–170.

The corresponding trans compounds were used for the next reaction step without purification.

D. PREPARATION OF TRANS 2-(p-CHLOROPHENYL)-1,3,4,6,7,11b - HEXAHYDRO - 9,10 - DIMETHOXY - 2H-BENZO[a]QUINOLIZINE 820 g. of trans-2-(p-chlorophenyl)-1,3,4,6,7,11b-hexahydro - 9,10-dimethoxy-2H-benzo[a]quinolizin-4-one are dissolved in 2200 ml. of anhydrous tetrahydrofuran and added gradually to a refluxing suspension of 0.4 g. lithium aluminum hydride in 3000 ml. of tetrahydrofuran. The mixture is heated under reflux for two hours after which the excess lithium aluminum hydride is decomposed by addition of the calculated amount of water. The metal hydroxides obtained are filtered off and washed with tetrahydrofuran. After drying with sodium sulphate and filtration tetrahydrofuran is distilled off leaving 660 g. of trans 2 - (p - chlorophenyl)-1,3,4,6,7,11b-hexahydro-9,10-dimethoxy-2H-benzo[a]quinolizine. The hydrochloride, prepared in ether, melts a 264–266° after crystallization from propanol.

In a similar manner, the following cis and trans 2-substituted 1,2,3,6,7,11b - hexahydro - 9,10 - dimethoxy-2H-benzo[a]quinolizines are obtained.

| Isomer | Substituent | Melting point of hydrochloride |
|--------|-------------|-------------------------------|
| cis    | 2-(o-chlorophenyl) | 193° (oxalate). |
| cis    | 2-(m-chlorophenyl) | 233–235°. |
| cis    | 2-(p-fluorophenyl) | 249–251°. |
| cis    | 2-(p-chlorophenyl) | 254–256°. |
| cis    | 2-(p-bromophenyl)  | 165–167°. |
| trans  | 2-(o-chlorophenyl) | 238–240°. |
| trans  | 2-(m-chlorophenyl) | 247–248°. |
| trans  | 2-(p-fluorophenyl) | 256–257°. |
| trans  | 2-(p-bromophenyl)  | 255–258°. |

EXAMPLE 3

*Trans 2-(p-bromophenyl)-1,2,3,6,7,11b-hexahydro-9,10-dimethoxy-2H-benzo[a]quinolizine*

A. PREPARATION OF 3-(p-BROMOPHENYL)-δ-VALEROLACTONE 139 g. of methyl hydrogen-3-(p-bromophenyl)glutarate (prepared as described in Example 2, step A) are left standing overnight with 100 ml. of thionyl chloride. Excess thionyl chloride is distilled off and the residue, mainly consisting of methyl 3-chloroformyl-2-(p-bromophenyl)butyrate is dissolved in 400 ml. of acetonitrile. The solution is added dropwise to a suspension of 20 g. of sodium borohydride in 250 ml. of acetonitrile at room temperature. The mixture is stirred for two hours. Excess sodium borohydride is decomposed by addition of a dilute hydrogen chloride solution under cooling. The aqueous layer is separated and extracted with ether. The ethereal solution is combined with the organic layer. The solvents are removed by evaporation and to the residue a 10% sodium hydroxide solution is added. The mixture is refluxed for approximately 1 hour and after cooling extracted with ether. The alkaline solution is acidified, 2-(p-chlorophenyl)-4-hydroxy valeric acid is extracted with ether and the solution, after drying with sodium sulphate and filtration, concentrated by evaporation of the ether. Toluene is added and water is removed by azeotropic distillation causing the acid to convert into 3-(p-bromophenyl)-δ-valerolactone. The toluene solution is added slowly to petroleum ether (boiling range 40–60°) in which the lactone is sparingly soluble. Melting point of product 91–93° after crystallization from a mixture of acetone and ether.

B. PREPARATION OF ETHYL 5-BROMO-3-(p-BROMOPHENYL)VALERATE

A stream of dry hydrobromic acid is passed, with stirring, through 38 g. of 3-(p-bromophenyl)-δ-valerolactone, dissolved in 90 ml. of ethanol, until the solution is saturated. The reaction mixture is heated under reflux for 1½ hours and left standing overnight. It is then poured onto ice water. The mixture is extracted with ether; the ethereal solution is washed with a bicarbonate solution and dried. Distillation yields 50.3 g. (93%) of ethyl 5-bromo-3-(p-bromophenyl)valerate, which is used for the next reaction step without purification.

C. PREPARATION OF 1-(3,4-DIMETHOXYPHENETHYL)-4-(p-BROMOPHENYL)PIPERID-2-ONE 50.6 g. of 3,4-dimethoxyphenethylamine, 50.3 g. of ethyl 5-bromo-3-(p-bromophenyl)valerate, 25 g. of potassium carbonate and 0.4 g. of potassium iodide in 700 ml. of xylene are heated under reflux for 20 hours. The inorganic salts are removed by filtration, the xylene solution is evaporated and the piperidone is obtained as a solid. Yield 49.4 g. (85%) of 1-(3,4-dimethoxyphenethyl)-4-(p-bromophenyl)piperid-2-one, melting at 130.5–132° after crystallization from acetone.

D. PREPARATION OF 2-(p-BROMOPHENYL)-1,2,3,4,6,7-HEXAHYDRO - 9,10 - DIMETHOXYBENZO[a]QUINOLIZINIUM CHLORIDE 47 g. of 1-(3,4-dimethoxyphenethyl)-4-(p-bromophenyl)piperid-2-one in 150 ml. of xylene are heated under reflux with 82 ml. of phosphorus oxychloride for 1 hour. The solvents are then removed by distillation under reduced pressure and the solid residue is washed with ether and dried. 41.5 g. (84.5%) of 2-(p-bromophenyl)-1,2,3,4,6,7-hexahydro - 9,10 - dimethoxybenzo[a]quinolizinium chloride is obtained.

For analytical purposes the perchlorate is prepared by liberation of the base and addition of perchloric acid to a solution of the base in ether. Melting point of the perchlorate is 258–260° after crystallization from dimethylformamide.

E. PREPARATION OF TRANS 2-(p-BROMOPHENYL)-1,3,4,6,7,11b-HEXAHYDRO - 9,10 - DIMETHOXY-2H-BENZO[a]QUINOLIZINE

To a solution of 30 g. of 2-(p-bromophenyl)-1,2,3,4,6,7 - hexahydro - 9,10 - dimethoxybenzo[a]quinolizinium chloride in 150 ml. of ethanol are added 30 g. of zinc and 300 ml. of concentrated hydrochloric acid. The mixture is heated at about 90° for 20 minutes and a clear solution is obtained. It is concentrated under reduced pressure and the residue is treated with ammonia. The ammoniacal solution is extracted with ether, and the ethereal solution dried, filtered and concentrated by evaporation of solvent. The residue is dissolved in 400 ml. of ethanol and 7 ml. of concentrated hydrochloric acid. 16.5 g. of crude trans 2-(p-bromophenyl)-1,3,4,6,7,11b - hexahydro - 9,10 - dimethoxy - 2H - benzo[a]quinolizine hydrochloride is ob-

EXAMPLE 4

*Trans 2-(p-chlorophenyl)-1,3,4,6,7,11b-hexahydro-9,10-dimethoxy-2H-benzo[a]quinolizine*

A. PREPARATION OF β-(p-CHLOROPHENYL-δ-VALEROLACTONE

A solution of 330 g. of 3-(p-chlorophenyl)glutaric anhydride (prepared as described in Example 1, step A) in 1700 ml. of acetonitrile is added gradually to a suspension of 90 g. of sodium borohydride in 600 ml. of acetonitrile at room temperature. The mixture is refluxed for 72 hours. Excess sodium borohydride is decomposed by addition of water. The acetonitrile layer is separated and the aqueous layer extracted with ether. The acetonitrile is concentrated by evaporation and the residue is boiled with 315 g. of potassium hydroxide in 3150 ml. of water. The alkaline solution is extracted with ether, acidified and again extracted with ether. The ethereal solution is dried and filtered. The ether is distilled off. Toluene is added and water removed by azeotropic distillation. The hot toluene solution is slowly added to petroleum ether (boiling range 40–60°) which causes 3-(p-chlorophenyl)-δ-valero-lactone to precipitate. Yield 207 g. of product (66.8%) melting at 73–74° after crystallization from ether.

B. PREPARATION OF 2-(p-CHLOROPHENYL)-1,2,3,4,6,7-HEXAHYDRO - 9,10 - DIMETHOXYBENZO[a]QUINOLIZINIUM IODIDE

A solution of 217 g. of 3,4-dimethoxyphenethylamine in 450 ml. of chloroform is added to 253 g. of 3-(p-chlorophenyl)-δ-valerolactone in 250 ml. of chlorofrom at room temperature. The mixture is boiled under reflux for 5 hours, washed with a 0.5 N hydrochloric acid solution and dried with sodium sulphate. Anhydrous benzene is added and distilled off until the last traces of water have been removed. 550 ml. of freshly distilled phosphorus oxychloride are added at reflux temperature. The mixture is kept refluxing for 4 hours. Excess phosphorus oxychloride and chloroform are distilled off. The residue is dissolved in butanol and 600 ml. of 12% ammonia solution are added dropwise under stirring at a temperature of about 80°. The mixture is kept at that temperature for about 8 hours. The ammonia solution is separated and the butanol solution is concentrated by evaporation. The residue, mainly consisting of 2-(p-chlorophenyl)-1,2,3,4,6,7-hexahydro-9,10-dimethoxybenzo[a]quinolizinium hydroxide, is dissolved in ethanol and the solution acidified with a 20% hydroiodic acid solution. The solvent is distilled off and the residue is treated with ether yielding 415 g. (72%) of 2 - (p - chlorophenyl) - 1,2,3,4,6,7 - hexahydro - 9,10-dimethoxybenzo[a]quinolizinium iodide melting at 178–183°.

C. PREPARATION OF TRANS-2-(p-CHLOROPHENYL)-1,3,4,6,7,11b-HEXAHYDRO - 9,10 - DIMETHOXY-2H-BENZO[a]QUINOLIZINE HYDROCHLORIDE 750 ml. of concentrated hydrochloric acid is added slowly to a mixture of 123 g. of 2-(p-chlorophenyl)-1,2,3,4,6,7-hexahydro - 9,10-dimethoxybenzo[a]quinolizinium iodide, 750 ml. of ethanol and 100 g. of zinc at a temperature of about 70°. The mixture is refluxed for about 15 minutes. Ethanol is distilled off and the residue treated with an ammonia solution. The free base, 2-(p-chlorophenyl)-1,3,4,6,7,11b-hexahydro - 9,10 - dimethoxy-2H-benzo[a]quinolizine, formed is dissolved in ethanol and an equivalent quantity of a solution of hydrochloric acid in ether is added. 70 g. (70%) of trans 2-(p-chlorophenyl)-1,3,4,6,7,11b - hexahydro - 9,10 - dimethoxy - 2H-benzo[a]quinolizine hydrochloride, melting at 235–239° after crystallization from dimethylformamide, are obtained.

What is claimed is:

1. A compound selected from the group consisting of the trans form of bases of the formula

[structural formula: benzo[a]quinolizine with two lower alkoxy substituents on the benzene ring and a halophenyl substituent]

and non-toxic acid-addition salts thereof.

2. Trans 2 - (halophenyl)-1,3,4,6,7,11b-hexahydro-9,10-dimethoxy-2H-benzo[a]quinolizine.

3. Trans 2 - (p-chlorophenyl)-1,3,4,6,7,11b-hexahydro-9,10-dimethoxy-2H-benzo[a]quinolizine.

4. A non-toxic acid-addition salt of the compound of claim 3.

5. Trans 2 - (p-bromophenyl)-1,3,4,6,7,11b-hexahydro-9,10-dimethoxy-2H-benzo[a]quinolizine.

6. A non-toxic acid-addition salt of the compound of claim 5.

References Cited

UNITED STATES PATENTS

| | | | |
|---|---|---|---|
| 3,132,147 | 5/1964 | Schopf et al. | 260—288 |
| 3,314,966 | 4/1967 | Brossi et al. | 260—289 |

NICHOLAS S. RIZZO, *Primary Examiner.*

D. DAUS, *Assistant Examiner.*

UNITED STATES PATENT OFFICE
CERTIFICATE OF CORRECTION

Patent No. 3,346,581                                                 October 10, 1967

Johan Gottjes

It is hereby certified that error appears in the above numbered patent requiring correction and that the said Letters Patent should read as corrected below.

Column 3, line 69, for "(2-chlorophenyl)" read -- (m-chlorophenyl) --; column 5, line 36, for "crysallizes" read -- crystallizes --; line 38, for "ether," read -- ether. --; line 54, for "(p-chlorphenyl)" read -- (p-chlorophenyl) --.

Signed and sealed this 26th day of November 1968.

(SEAL)
Attest:

Edward M. Fletcher, Jr.                                      EDWARD J. BRENNER
Attesting Officer                                                 Commissioner of Patents